United States Patent
Folken et al.

(10) Patent No.: US 7,509,221 B2
(45) Date of Patent: Mar. 24, 2009

(54) CUSTOM CONFIGURATION STRATEGY FOR ON-PACKAGE GENSET CONTROLLERS

(75) Inventors: Keith R. Folken, West Peoria, IL (US); Michael A. Dvorsky, Peoria, IL (US); James D. McBurney, Metamora, IL (US); Julie Boley, Peoria, IL (US); Stephen C. Nofsinger, Washington, IL (US); David L. Zwetz, II, Morton, IL (US); Andrew W. Black, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/654,424

(22) Filed: Jan. 17, 2007

(65) Prior Publication Data

US 2008/0172200 A1    Jul. 17, 2008

(51) Int. Cl.
*G01C 19/00* (2006.01)
(52) U.S. Cl. .................. 702/104; 702/93; 702/193; 702/188; 702/108; 702/122; 700/292; 700/286; 700/287; 361/193
(58) Field of Classification Search ............ 700/292, 700/286, 287; 702/93, 104, 193, 188, 108; 702/122; 361/193
See application file for complete search history.

(56) References Cited

U.S. PATENT DOCUMENTS

| | | | |
|---|---|---|---|
| 4,677,558 A | 6/1987 | Bohmler et al. | |
| 5,091,858 A | 2/1992 | Paielli | |
| 6,000,825 A | 12/1999 | Fredriksson | |
| 6,172,428 B1 | 1/2001 | Jordan | |
| 6,351,692 B1 | 2/2002 | Eaton et al. | |
| 6,553,336 B1 * | 4/2003 | Johnson et al. | 702/188 |
| 2002/0103613 A1 | 8/2002 | Maher et al. | |
| 2004/0010349 A1 * | 1/2004 | Perez et al. | 700/287 |
| 2005/0238336 A1 | 10/2005 | Bekker | |

* cited by examiner

*Primary Examiner*—Tung S Lau
*Assistant Examiner*—Sujoy K Kundu
(74) *Attorney, Agent, or Firm*—Liell & McNeil

(57) ABSTRACT

A method of setting up a genset system for operation includes selecting one of a plurality of different sensors to monitor an operating parameter of a genset system, and coupling the selected sensor with a data processor of the genset system. The method further includes configuring the data processor for processing inputs from the selected sensor, for example an optional replacement sensor, by entering custom sensor calibration data for the selected sensor and recording the custom sensor calibration data on at least one computer writable medium of a control system for the genset system. A genset system includes a combustion engine, a generator, a set of standard sensors, and a control system. The control system includes a data processor configured to receive and process inputs from custom sensors, and includes a computer writable medium for storing custom sensor calibration data.

20 Claims, 3 Drawing Sheets

CUSTOM CONFIGURATION STRATEGY FOR ON-PACKAGE GENSET CONTROLLERS

TECHNICAL FIELD

The present disclosure relates generally to custom configurable genset controllers and methods, and relates more particularly to a genset controller configuration and set-up process for configuring an on-package genset controller to process inputs from optional and/or replacement sensors different from standard, on-package sensors of the genset system.

BACKGROUND

Gensets typically consist of a combustion engine coupled with an electric generator for generating electric power from the combustion of hydrocarbon fuels and the like. Although the combination of an electric generator and combustion engine has been known for many decades, improvements in design, components, operation, controls, etc. continue to be developed. As such, there are many different subsystems, sensors, controllers and other components that may be combined together in modern genset systems.

One area of genset-related technology that continues to see advances in component design and operation relates to the sensing/monitoring of various operating parameters in a genset system. In particular, it is common for genset users to replace existing, standard sensors of the genset system with replacement sensors. The existing sensors may be worn out, defective, or a superior version simply available. Similarly, changing or adding hardware, changing oil type and other modifications to a genset system may render the standard factory installed sensors inadequate. Users may also wish to add optional sensors to the system to monitor parameters not previously considered important, or where monitoring was previously not required in a particular jurisdiction. Most gensets come equipped with an on-package genset controller, which is used to control operation of the genset responsive to a variety of sensed operating parameters. Genset controllers are also typically configured to raise various alerts when undesired operating conditions occur, or a risk exists that they will occur.

It is common for genset controllers to be pre-configured to receive and process inputs from standard sensors of the system via sensor calibration data stored in the form of hard coded sensor maps, i.e. maps programmed into the code of the genset system. For example, in a typical approach, the genset controller will interpret inputs from system sensors and output corresponding signals based on map data that is programmed into the operating code for the genset controller. If a replacement sensor having different output characteristics is added to the genset system, however, the genset controller may be unable to properly process the sensor data with the existing maps. Sub-optimal sensor data processing can result in alarms being unnecessarily tripped or, worse, not tripped when they should be, can compromise attempts to control operating efficiency and emissions, and a host of other problems. In one example, improper sensor data processing could simply cause a genset to run out of fuel where the controller indicates the tank is still partially full based on faulty data processing.

In an attempt to accommodate a user's desire to add new sensors, replace old or defective sensors with upgraded versions, etc., it has been common for genset manufacturers to write the necessary software fixes, and send them out to customers. The drawbacks of painstaking code writing to address the simple swapping of sensors or addition of new sensors to a genset system by an end user will be readily apparent.

The desirability of importing at least some flexibility to genset control systems has been recognized for some time. To this end, certain strategies have been proposed to permit a genset controller to be configured for use with different gensets. One such configurable controller is proposed in U.S. Pat. No. 6,351,692 B1 to Eaton et al. ("Eaton"). In Eaton's approach, a genset controller includes a memory for storing different software routines, a personality profile data set and a user-settable data set. Changes to the personality profile data set and the user-settable data set can be downloaded to the memory. While Eaton's strategy may improve flexibility by providing data specific to a particular genset, it is desirable to provide much greater flexibility in terms of a user's interaction with and customization of a genset controller, as Eaton contemplates only limited types of data that can be input, none of which allow for simplified sensor changes, additions or upgrades via inputting of calibration data.

The present disclosure is directed to one or more of the problems or shortcomings set forth above.

SUMMARY OF THE INVENTION

In one aspect, the present disclosure provides a method of setting up a genset system for operation. The method includes the steps of selecting a sensor from among a plurality of different sensors configured to monitor an operating parameter of a genset system, and coupling the selected sensor with a data processor of the genset system. The data processor is configured to process input from a set of standard sensors via stored standard sensor calibration data. The method further includes the step of configuring the data processor for processing inputs from the selected sensor, including a step of entering custom sensor calibration data for the selected sensor.

In another aspect, the present disclosure provides a genset system. The genset system includes a combustion engine and an electrical generator coupled with the combustion engine. The genset system also includes a set of standard sensors each configured to monitor an operating parameter associated with at least one of the combustion engine and the electrical generator. The genset still further includes a control system having a data processor configured to receive and process inputs from the standard sensors and including a computer readable medium whereon sensor calibration data for the standard sensors is stored. The data processor is further configured to receive and process inputs from at least one custom sensor, the control system further including at least one computer writable medium configured to store custom sensor calibration data for at least one custom sensor.

DETAILED DESCRIPTION

Figure 1:
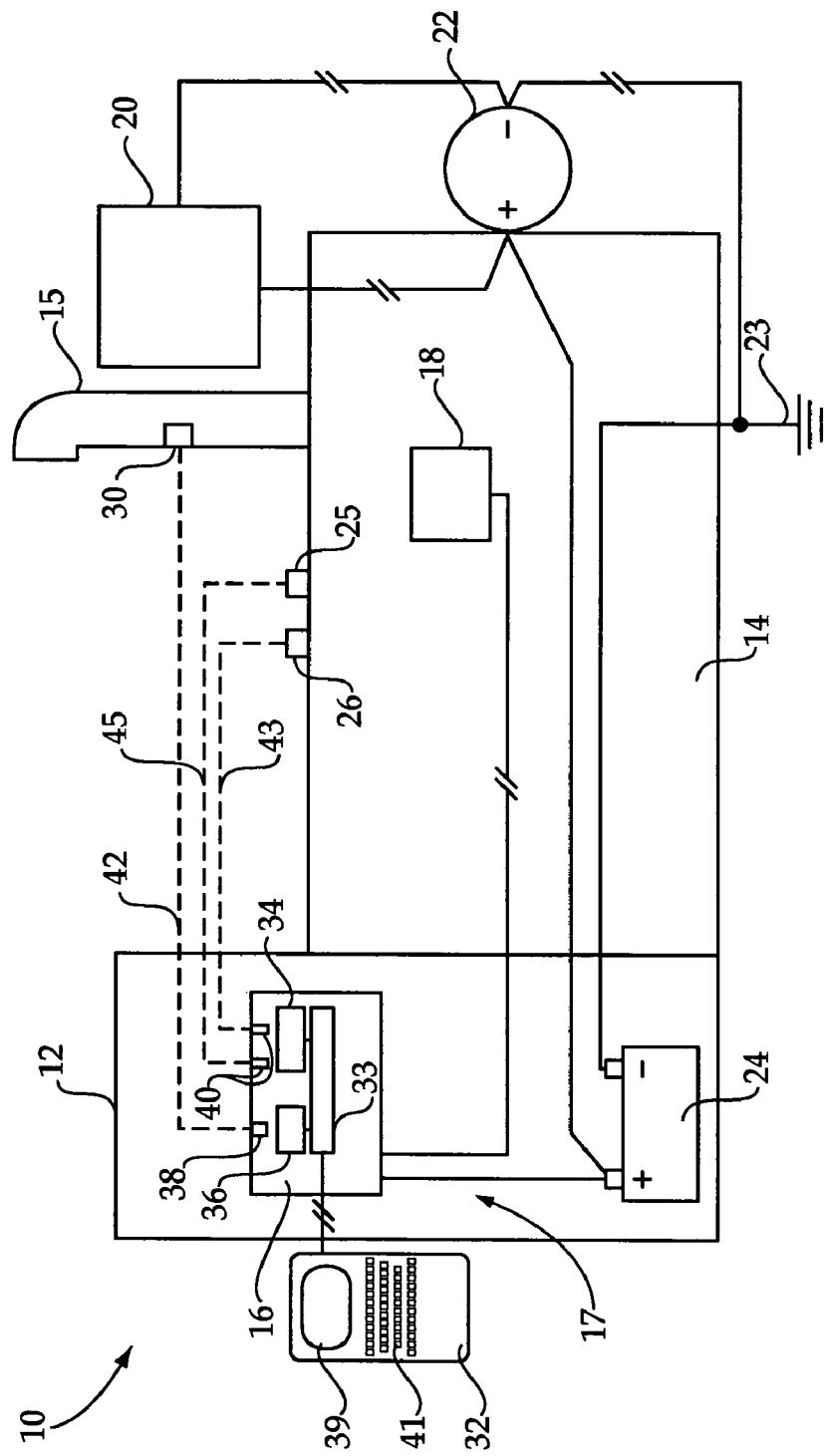
FIG. 1 is a schematic illustration of a genset system according to one embodiment.

Referring to FIG. 1, there is shown a genset system 10 in accordance with the present disclosure. Genset system 10 includes a generator 12 configured to be driven by a combustion engine 14 such as an internal combustion engine. Genset system 10 may include a wide variety of features, depending upon its size, operating environment, application, etc. An exhaust outlet 15 may be provided, a starter motor 22, a battery 24, electrically powered subsystems 20 and an electrical ground 23. A control system 17 for genset system 10 may further be provided, which includes a genset controller 16 comprising a data processor, and may also include an engine controller 18 in communication therewith. In other embodiments, a single controller for genset system 10 might be used. Genset controller 16 will monitor and process sensor inputs corresponding to a variety of operating parameters of genset system 10, as further described herein. A unique set up configuration strategy for genset controller 16 will enable flexibility of genset system 10 in adapting to the use of new hardware via user interaction in a manner not possible with earlier genset systems, as further described herein.

To this end, genset system 10 may further include a user interface 32, such as a graphical user interface having a display screen 39, keypad 41 or the like, coupled with genset controller 16. During a process of setting up genset system 10 for operation with new or replacement hardware such as sensors, a user or manufacturer's technician can utilize interface 32 for configuring genset controller 16 for use with the new hardware, as further described herein.

Genset system 10 may further include a plurality of standard sensors, two of which are shown 25 and 26. Each of sensors 25 and 26 may be in communication with genset controller 16 via communication lines 45 and 43, respectively. Communication lines 45 and 43, which could be wireless, may connect with controller 16 via standard inputs 40 in a conventional manner. The term "standard" is used herein to refer to sensors/inputs which are provided and configured as on-package elements of genset system 10 upon manufacturing. In other words, genset system 10, like most genset systems, will arrive at an end user already configured with a set of standard sensors contemplated as necessary for proper operation. The standard sensors may include, but are not limited to, engine speed sensors, engine load sensors, fuel level sensors, engine and/or oil temperature sensors, pressure sensors for one or more intake manifolds of combustion engine 14, fuel level sensors, and a variety of others. In any case, however, the standard sensors will each be configured to monitor an operating parameter associated with at least one of generator 12 and combustion engine 14.

Controller 16 will typically include a computer readable medium or memory 34 such as a hard drive, ROM, RAM or some other suitable medium. As further described herein, memory 34 may be a writable medium. Standard sensor calibration data, for instance sensor map data, may be stored in memory 34 such that controller 16 is configured to process inputs from its standard sensors 25 and 26 via the stored sensor calibration data. In most embodiments, controller 16 will be configured with the stored standard sensor calibration data at the factory. Further, memory 34 will typically comprise a writable medium such that stored standard sensor calibration data can be replaced with custom sensor calibration data inputted via user interface 32. In other embodiments, memory 34 might comprise a read only medium, however, in most instances it will be desirable to permit overwriting of standard sensor calibration data stored on memory 34 to optimize the flexibility of genset system 10. To this end, control system 17 may further include a memory writing device 33 coupled with memory 34 which is configured to replace standard sensor calibration data stored thereon by recording custom sensor calibration data. Memory writing device 33 could comprise controller 16 itself, depending on the type of medium comprising memory 34, or a standard hard drive writing device, for example, which may be activated via interface 32.

Memory writing device 33 may also be coupled with at least one other computer writable medium 36 of control system 17. It will be appreciated that rather than separate media, control system 17 might include a single memory, although separate storage media are shown in FIG. 1. Memory writing device 33 may be configured to record custom sensor calibration data for at least one custom sensor on computer writable medium 36. The at least one custom sensor may comprise a replacement sensor for one of standard sensors 25 and 26, or it might include a new, optional sensor added to genset system 10 to enable monitoring of an operating parameter previously not monitored. In FIG. 1, an optional sensor 30 is shown disposed in exhaust outlet 15, and could include an exhaust gas temperature sensor, for example, not standard on certain genset systems and, hence, optional. A great many other optional sensors, requiring inputting custom sensor calibration data, could be coupled with controller 16, and thus the illustration of an exhaust gas temperature sensor is purely for illustrative purposes. It is contemplated, however, that many optional sensors which might be added to genset system 10 will fall into one of several classes, including temperature sensors, pressure sensors and "level" sensors such as are used for monitoring fluid levels of fuel, oil, coolant, etc. Optional sensor 30 may be coupled with controller 16 by a data link, which could be wireless, via an optional input 38.

As mentioned above, when a replacement or optional sensor is coupled with controller 16, custom sensor calibration data corresponding to the new sensor may be inputted via user interface 32. It is contemplated that the custom sensor calibration data may comprise sensor map data. As will be well understood by those skilled in the art, many sensors are analog sensors which output a signal having a direct or ascertainable relationship with a sensed parameter. For instance, a typical analog pressure sensor may output a signal corresponding to an electrical resistance, the resistance being roughly proportional to a pressure acting on a sensing element of the sensor. These signals may be input to a controller having a data processor, and processed to generate an output signal perceptible by a user or the controller to determine the actual pressure being sensed. The controller, such as controller 16, will typically operate via software control to interpret the signals via calibration data such as map data stored in memory 34.

As discussed above, many earlier genset controllers included hard coded sensor maps, wherein sensor calibration data such as map data was written into the code or stored in read only memory. The present disclosure differs from these earlier approaches in that the sensor calibration data may be stored at a predetermined address in writable memory, referenced by controller 16, but not incorporated into the software instructions, or other code, ROM, etc. This enables a replacement or optional sensor to be added and custom sensor calibration data entered at the same predetermined address where the earlier calibration data was stored. It is thus possible to maintain the same operating code when incorporating custom sensor calibration data, as it may readily be input via user interface 32.

It is further contemplated that the inputted sensor calibration data may consist of sensor map data, for example non-linear map data. While improved linearity in sensor output continues to be sought after in the art, most readily available sensors have an output that is at least partly non-linear. Even where sensors have a relatively more linear output, they may be used to sense phenomena that is itself not linear, for example the depth of liquid fuel in a fuel tank having a non-uniform shape, such as conical instead of rectangular. Setting up a genset controller to process signals from any particular selected sensor, whether a replacement sensor or a new sensor, thus typically requires accounting for different outputs among different sensors, non-linearity in the sensor output and/or non-linearity in the phenomenon being monitored. Consequently, maps required to accurately process signals from sensors in a genset system may be relatively complex, and be quite specific to the selected sensor and/or monitored parameter. In one embodiment according to the present disclosure, a user may configure controller 16 to process signals from a replacement or optional sensor via inputting custom sensor map data including at least minimum and maximum map values and at least one other map value between the maximum and minimum map values which is in a non-linear portion of a range of the map in order to enable sufficiently accurate processing of signals from the added sensor. In still further embodiments, a relatively greater total number of map values may be inputted, for example five or more map values, and even a total of twenty five map values in certain embodiments. It will therefore be appreciated that entering the custom calibration data, such as the discrete map values described herein, allows a calibration profile for a given custom sensor to be constructed so that signals from the sensor are accurately processed.

In some instances, it may further be desirable to assign the selected replacement or optional sensor to one of a predetermined set of sensor assignments. For example, where multiple similar sensors are used to monitor similar operating parameters such as manifold pressure in more than one intake or exhaust manifold, it may be desirable to identify a particular sensor and a particular input of controller 16 as a "left" manifold sensor or a "right" manifold sensor. In other instances, previously unused control code will be executed upon detection of an optional sensor now communicating with a previously unused input to the controller.

INDUSTRIAL APPLICABILITY

Figure 3:
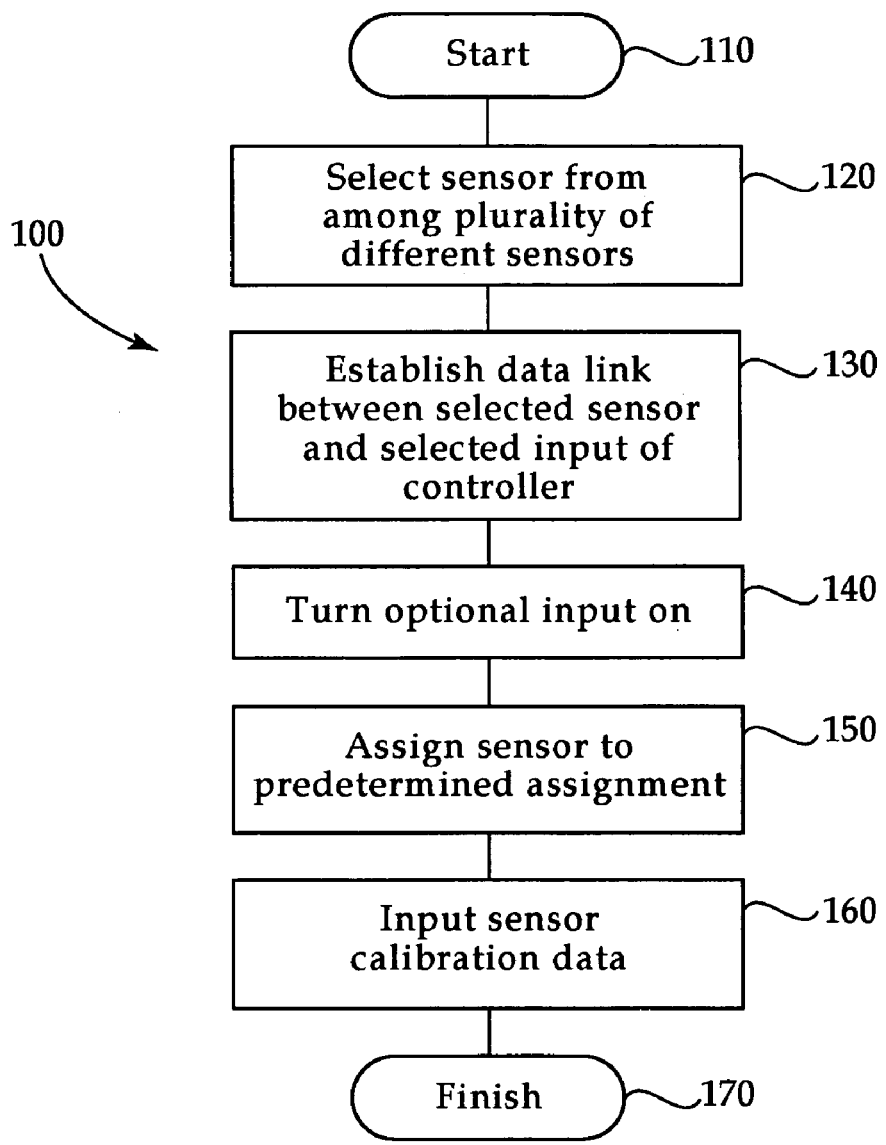
FIG. 3 is a flow chart illustrating a genset set-up process according to one embodiment.

Turning to FIG. 3, there is shown an exemplary process 100 of setting up a genset system for operation within the context of the present disclosure. Process 100 may begin at step 110, a START, and may then proceed to step 120 wherein a sensor is selected from among a plurality of different sensors configured to monitor a selected operating parameter of genset system 10. As discussed above, the selected sensor may comprise a replacement sensor for one of standard sensors 25, 26, or another standard sensor, or it might comprise an optional sensor such as sensor 30 configured to monitor an operating parameter of genset system 10 not previously monitored.

From step 120, process 100 may proceed to step 130 wherein a data link between the selected sensor and controller 16 is established, for example by coupling optional sensor 30 with optional input 38. From step 130, process 100 may proceed to step 140 to enable processing of inputs from the selected sensor. It will be appreciated that where a replacement sensor is selected, step 130 may be unnecessary, however, with regard to optional sensors, controller 16 will typically be configured to initiate processing of signals from optional sensor 30 only upon activation. In some instances, this may be automatic upon the controller now receiving data at an optional, previously unused input. From step 140, process 100 may proceed to step 150 to assign the selected sensor to one of the predetermined sensor assignments, such as a left manifold, right manifold, first fuel tank, second fuel tank, etc. as might be needed. From step 150, process 100 may proceed to step 160 wherein a user may input a minimum map value, a maximum map value and at least one other map value, as described herein, to define a map range. From step 150, process 100 may proceed to step 170 to FINISH.

Figure 2:
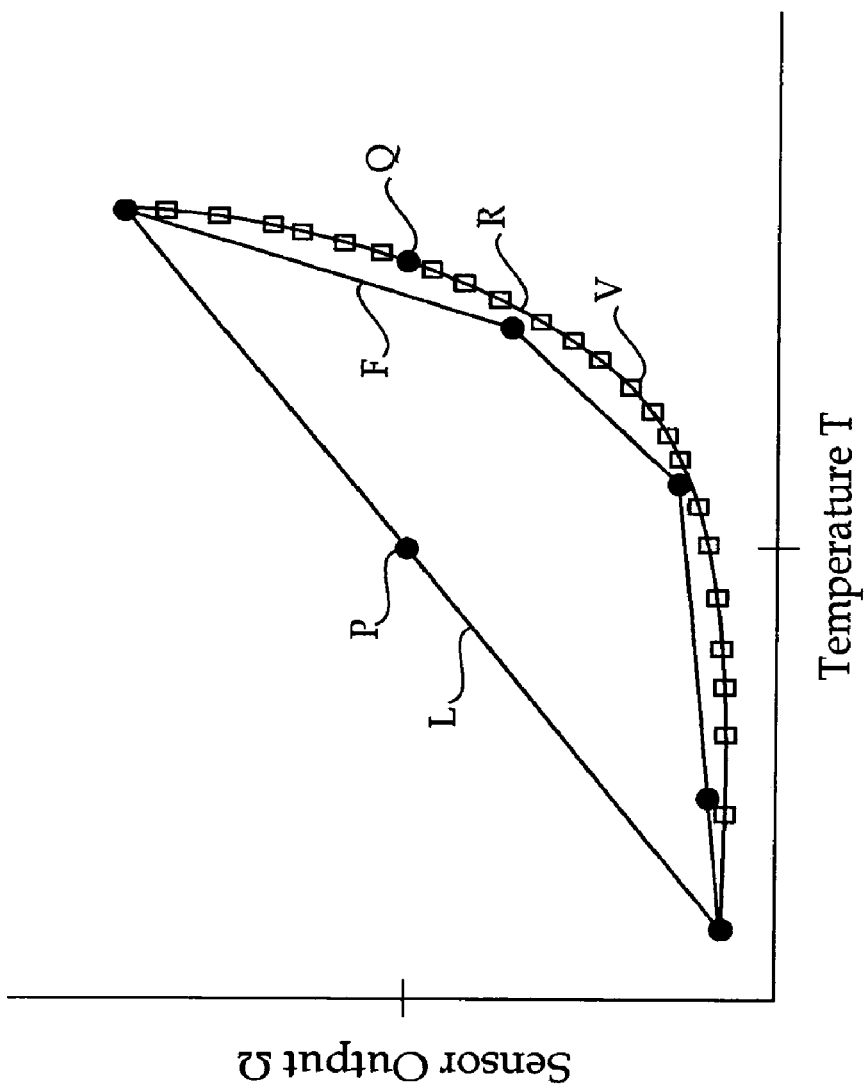
FIG. 2 is a graph illustrating sensor calibration and sensor output data.

Referring now to FIG. 2, there is shown a graph illustrating several different curves relating sensor output in ohms, on the Y-axis, to temperature, on the X-axis. Curve R represents an actual electrical resistance of a sensing element in a sensor. Curve L represents a conventional, linear two point curve between maximum and minimum map values which may be used in some instances to attempt to relate sensor output to the actual value of the sensed parameter of interest. Curve F represents a five point curve, giving a substantially better approximation of the actual temperature based on sensor output than a map according to curve L. The approximation of curve V, represented by the group of boxes substantially overlying curve R, is better still, corresponding to a twenty five point map. In genset systems according to the present disclosure, sensor calibration data in the form of non-linear map data will typically be entered, including a minimum of three map values, and more commonly five map values or even twenty five map values.

In a genset system sensors may be used to trip alarms, for example when oil temperature reaches a threshold at the upper limit of what is considered an acceptable temperature range. It is common in conventional genset systems to utilize linear two point maps, such as that represented via curve L in FIG. 2, or other hard coded maps specific to a particular sensor. The controller will typically interpolate values between the stored map values to arrive at an estimate of the actual value of the parameter of interest. When an old sensor is de-coupled from the genset system, for example, one of standard sensors 25 and 26 of genset system 10, and a replacement sensor is incorporated, however; alarms could be tripped unnecessarily or fail to trip when they should. Using a map such as that represented by curve L in FIG. 2, a controller would interpret a signal from a temperature sensor corresponding to an electrical resistance which falls somewhere between the maximum and minimum map values as corresponding to a particular temperature. For example, a received signal which is approximately half way between the maximum and minimum map values, point P. would be interpreted as corresponding to a certain temperature which is actually much lower than the actual temperature corresponding to that signal, as indicated by point Q on the actual resistance curve R. For certain sensors, a linear two point map, or a map specific to a certain sensor, might work sufficiently well. However, as discussed above, replacement sensors can introduce problems. In earlier systems, controllers either had to be reconfigured with new software to accurately process inputs from replacement sensors, or users simply plugged in the replacement sensors and relied on the use of the existing maps by the controller. The present disclosure thus provides a means for avoiding inaccurate monitoring by making it easy for users to reconfigure the genset controller.

The present disclosure thus provides a genset system set up strategy, and a genset system configuration, whereby additional sensors may be added to the system, and controller 16 readily configured to accommodate the different sensor inputs. In many cases, the sensor map information that is inputted may be obtained from the sensor manufacturer, permitting a user to perform all of the steps necessary to configure the genset system for the changes attendant to a replacement or optional sensor. The present approach differs dramatically from the state of the art, wherein incorporation of optional sensors or replacement sensors differing from the sensors they replace required writing new software patches for the code, or simply inaccurately processing sensor signals.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For instance, while the foregoing description indicates that standard sensor calibration data will typically be stored on a rewritable medium to permit it to be overwritten when replacement sensors are added, this need not be the case. Genset system 10 might include hard coded sensor maps, or sensor maps stored in read only memory, but also include the at least one writable medium for accommodating only optional sensors. For example, a computer writable memory could simply be battery backed RAM. Other aspects, features and advantages will be apparent upon an examination of the attached drawings and appended claims.

What is claimed is:

1. A method of setting up a genset system for operation comprising the steps of:
   selecting a sensor from among a plurality of different sensors configured to monitor an operating parameter of a genset system;
   coupling the selected sensor with the genset system, including coupling the selected sensor with a data processor of the genset system, the data processor being configured to process inputs from a set of standard sensors via stored standard sensor calibration data; and
   configuring the data processor for processing inputs from the selected sensor, including a step of entering custom sensor calibration data for the selected sensor via a user interface of the genset system;
   wherein the step of configuring further includes a step of constructing a calibration profile for the selected sensor, including entering discrete calibration data inputs with the user interface.

2. The method of claim 1 wherein the step of entering custom sensor calibration data includes entering sensor map data.

3. The method of claim 2 wherein the step of entering custom sensor calibration data further includes inputting maximum and minimum map values defining a map range and at least one other map value between the maximum and minimum values which is within a non-linear portion of the map range.

4. The method of claim 3 wherein the configuring step further comprises a step of assigning the selected sensor to one of a predetermined set of sensor assignments.

5. The method of claim 3 wherein the step of entering custom sensor calibration data further includes inputting five or more map values.

6. The method of claim 2 wherein the configuring step further includes a step of recording the custom sensor calibration data on a computer writable medium of the genset system.

7. The method of claim 6 wherein the step of recording the custom sensor calibration data further includes overwriting standard sensor calibration data stored on a computer writable medium of the genset system.

8. The method of claim 2 wherein the selecting step comprises selecting an optional sensor, and wherein the coupling step comprises establishing a data link between the optional sensor and an optional input of the data processor.

9. The method of claim 8 wherein the data processor is configured via coded instructions to reference custom sensor map data for the optional sensor at a predetermined address, and wherein the configuring step further comprises a step of configuring the data processor to reference custom sensor map data at the same predetermined address.

10. The method of claim 2 further comprising a step of decoupling a first sensor from an input of the data processor, wherein the selecting step comprises selecting a replacement sensor for the first sensor, and wherein the coupling step comprises coupling the replacement sensor with the data processor via the input.

11. The method of claim 10 wherein the data processor is configured via coded instructions to reference standard sensor map data at a predetermined address, and wherein the configuring step further comprises a step of configuring the data processor to reference custom sensor map data at the same predetermined address.

12. The method of claim 2 wherein the selecting step comprises selecting one of, a fluid level sensor, a pressure sensor and a temperature sensor, and wherein the configuring step further includes entering custom map data corresponding to a non-linear curve.

13. The method of claim 12 wherein the step of configuring the data processor further comprises configuring the data processor via a user interface coupled with the genset system.

14. The method of claim 13 wherein the user interface is coupled with a memory writing device of the genset system, and wherein the configuring step further includes activating the memory writing device via the user interface for recording the custom sensor calibration data on a computer writable medium.

15. A genset system comprising:
   a combustion engine;
   an electrical generator coupled with said combustion engine;
   a set of standard sensors each configured to monitor an operating parameter associated with at least one of the combustion engine and the electrical generator; and
   a control system for the genset system comprising a data processor configured to receive and process inputs from said standard sensors and having a computer readable medium whereon sensor calibration data for said standard sensors is stored;
   said data processor further being configured to receive and process inputs from at least one custom sensor, said control system further comprising at least one computer writable medium, and said genset system having a user interface configured for entering custom sensor calibration data for at least one custom sensor for storing on said at least one computer writable medium; and
   said control system further being configured via receiving discrete calibration data inputs via said user interface to construct a calibration profile for the selected sensor.

16. The genset system of claim 15 further comprising a memory writing device configured to record inputted custom sensor calibration data on said at least one computer writable medium.

17. The genset system of claim 16 wherein said computer readable medium also comprises a computer writable medium, said memory writing device being configured to replace standard sensor calibration data with custom sensor calibration data for said at least one custom sensor which is inputted via said user interface.

18. The genset of claim 16 wherein said data processor is configured to receive and process inputs from at least one optional sensor, wherein said user interface is configured for inputting custom non-linear map data for at least one optional sensor, and wherein said memory writing device is configured to record the custom non-linear map data on said at least one computer writable medium.

19. The genset system of claim 18 further comprising an optional sensor coupled with said data processor, including one of a fluid level sensor, a pressure sensor and a temperature sensor.

20. The genset system of claim 18 wherein said data processor is configured to process inputs from said at least one custom sensor via custom non-linear map data at one or more predetermined addresses on said at least one computer writable medium, and further configured to process inputs from each of said set of standard sensors via map data at one or more predetermined addresses on said computer readable medium.

\* \* \* \* \*